2 Sheets—Sheet 1.
C. K. RAMSEY.
Combined Ash Box and Sifter.
No. 208,266.      Patented Sept. 24, 1878.
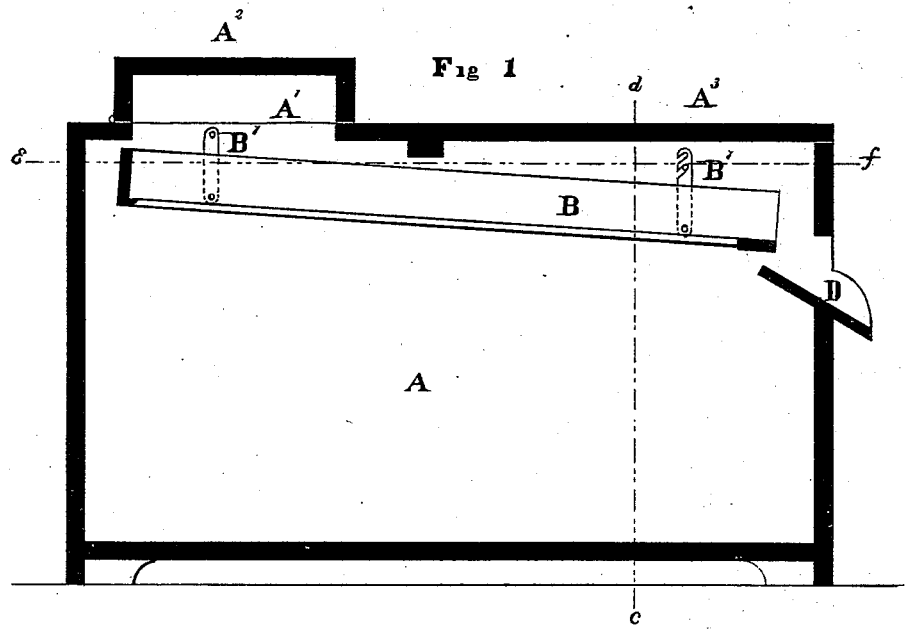
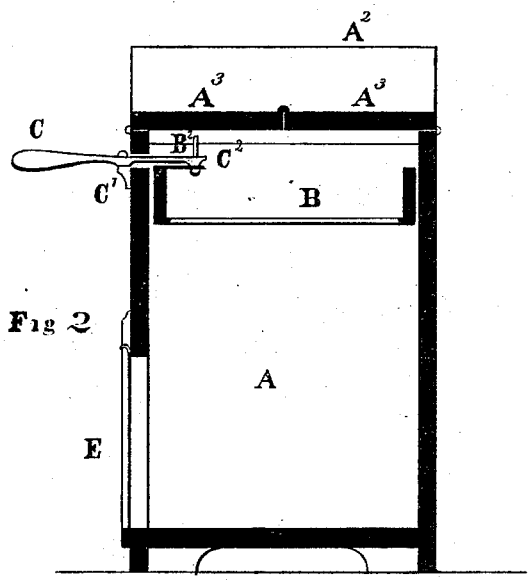
Attest:
Chas. Heister
Paul Bakewell
Inventor:
Chas. K. Ramsey,
by Chas. D. Moody,
atty.

2 Sheets—Sheet 2.
C. K. RAMSEY.
Combined Ash Box and Sifter.
No. 208,266.  Patented Sept. 24, 1878.
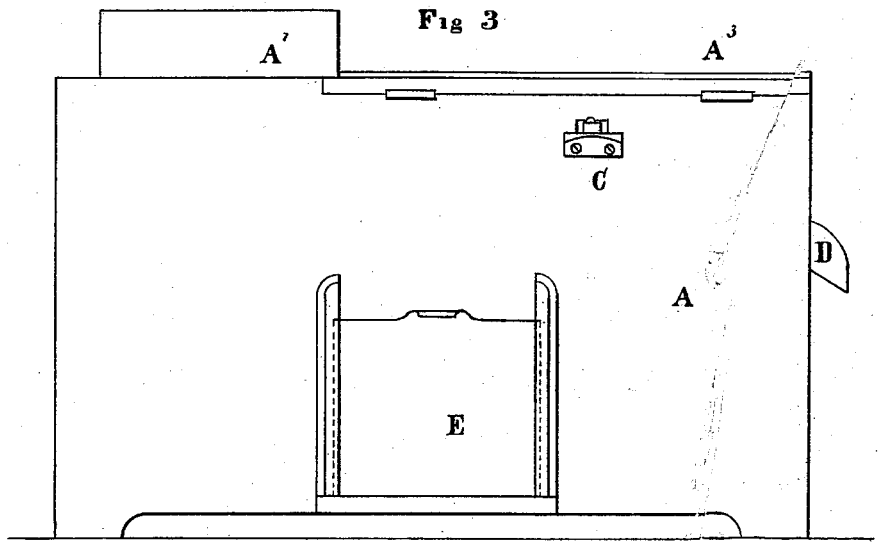
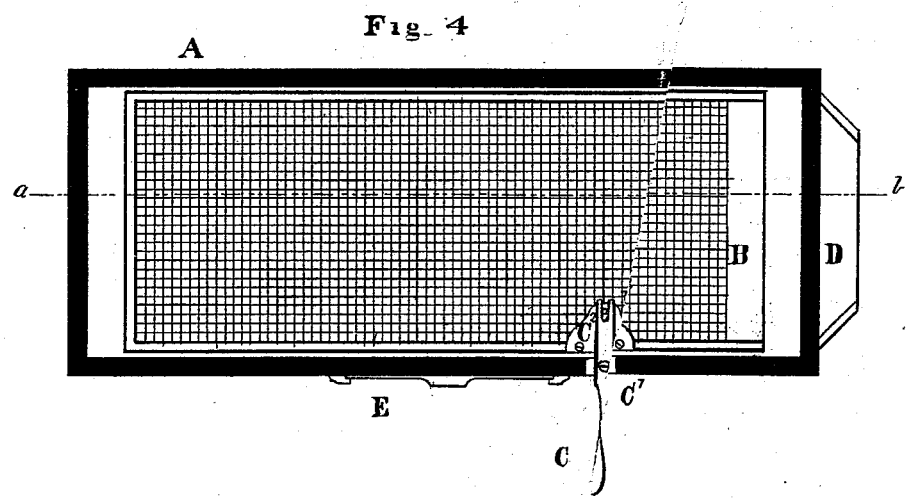
Attest:
Chas. Heisler
Paul Bakewell
Inventor:
Chas. K. Ramsey,
by Chas. D. Moody,
atty.

UNITED STATES PATENT OFFICE.

CHARLES K. RAMSEY, OF ST. LOUIS, MISSOURI.

IMPROVEMENT IN COMBINED ASH BOX AND SIFTER.

Specification forming part of Letters Patent No. 208,266, dated September 24, 1878; application filed March 20, 1878.

*To all whom it may concern:*

Be it known that I, CHARLES K. RAMSEY, of St. Louis, Missouri, have made a new and useful Combined Ash Box and Sifter, of which the following is a full, clear, and exact description, reference being had to the annexed drawings, making part of this specification, in which—

Figure 1 is a longitudinal vertical section of the invention, taken on the line $a$ $b$ of Fig. 4; Fig. 2, a cross-section taken on the line $c$ $d$ of Fig. 1; Fig. 3, a side elevation, and Fig. 4 a horizontal section taken on the line $e$ $f$ of Fig. 1.

The same letters of reference denote the same parts.

The present invention is an improvement in that class of ash-sifters wherein the principal feature is an inclined oscillating screen, upon which the ashes are placed, and which, when shaken, causes the fine ashes to be dropped directly beneath it, and the coarser portion to be discharged in another direction from the lower end of the sieve, and so as to be readily collected. It has especial relation to the construction of the upper part of the ash-box, containing the screen, by means whereof the box can be opened and the screen exposed throughout its length, so that any part may be reached for the removal of cinders or any other matter that may become caught in the sieve and obstruct the operation, but which during the sifting can be closed to confine the dust, and also so as to make it inconvenient for the sieve to be lifted from its place, that the ashes may be dumped directly in the ash-receptacle.

Referring to the drawings, A represents the ash-box, having the opening $A^1$ closed by the cover $A^2$. B represents the sieve, constructed and arranged as shown, and suspended in position by means of the hangers $B^1$ $B^1$. A lever, C, that is pivoted to the box at $C^1$, extends through the side of the box, and at its inner end, $C^2$, is slotted, to enable a pin, $B^2$, that is on the sieve to engage therein. By moving the lever to and fro the sieve is made to oscillate longitudinally in the box. D represents the chute at the end of the box to receive that portion of the ashes that passes from the lower end of the sieve. The fine ashes fall beneath the sieve into the lower part of the box, that can be entered through the door E.

In operation, the ashes are placed directly on the sieve at the upper end thereof, and the cover $A^2$ is closed down upon the opening $A^1$, and also over the lids $A^3$ $A^3$, which, in turn, serve to cover the remaining portion of the box. As the ashes are apt to be heaped up at the beginning of the operation, so as to come above the opening $A^1$, the cover $A^2$ is preferably made in the form of a turret, as shown. The straight sides of the latter prevent the ashes from collecting therein, as is apt to occur with the ordinary tapering hopper. The sifting is now effected in the usual manner, the fine ashes dropping directly down, and the coarser portion working down along and out from the sieve into the chute D. Frequently cinders become fastened in the sieve, (which it is desirable to keep as nearly horizontal as is practicable in order to thoroughly sift the ashes,) and arrest the movement of the ashes toward the chute, requiring the box to be opened, so that the sieve can be reached. This is done by turning back the cover $A^2$ and then raising the lids $A^3$ $A^3$, whereupon the entire sieve becomes accessible, and enabling the obstruction to be readily observed and removed. This, however, involves such labor as to make it more inconvenient for a servant to remove the sieve for the sake of placing the entire ashes in the ash-receptacle beneath the sieve than to carry out the sifting operation in the legitimate way. By means, then, of the present improvement, ashes can be readily and properly sifted without the annoyance of dust and without waste.

I claim—

The box A, having the opening $A^1$, cover $A^2$, and lids $A^3$ $A^3$, hinged toward each other, and secured in place by the cover $A^2$, which is hinged to the end of the box A, in combination with the inclined oscillating sieve B, substantially as described.

Witness my hand.

CHAS. K. RAMSEY.

Witnesses:
   CHAS. HEISLER,
   PAUL BAKEWELL.